US007328924B2

(12) United States Patent
Moilanen et al.

(10) Patent No.: US 7,328,924 B2
(45) Date of Patent: Feb. 12, 2008

(54) ADJUSTABLE TIP ASSEMBLY

(75) Inventors: Steven M. Moilanen, Fort Wayne, IN (US); Bruce D. McIntosh, Monroeville, IN (US); William D. Givens, Berne, IN (US); William E. Davenport, Fort Wayne, IN (US)

(73) Assignee: PHD, Inc., Fort Wayne, IN (US)

(*) Notice: Subject to any disclaimer, the term of this patent is extended or adjusted under 35 U.S.C. 154(b) by 0 days.

(21) Appl. No.: 11/009,144

(22) Filed: Dec. 10, 2004

(65) Prior Publication Data

US 2005/0200086 A1 Sep. 15, 2005

Related U.S. Application Data

(60) Provisional application No. 60/529,361, filed on Dec. 12, 2003, provisional application No. 60/550,495, filed on Mar. 5, 2004.

(51) Int. Cl.
*B25J 15/10* (2006.01)

(52) U.S. Cl. .................... 294/86.4; 294/902; 269/266; 901/39

(58) Field of Classification Search ............... 294/86.4, 294/119.1, 902, 95, 116, 94, 86.25, 86.3, 294/86.31; 901/39; 269/266
See application file for complete search history.

(56) References Cited

U.S. PATENT DOCUMENTS

| | | | | | |
|---|---|---|---|---|---|
| 1,081,427 | A | * | 12/1913 | Brummett et al. | 294/86.2 |
| 1,402,677 | A | * | 1/1922 | Smith | 294/86.27 |
| 1,635,622 | A | * | 7/1927 | Henderson | 294/86.27 |
| 2,486,494 | A | * | 11/1949 | Rice | 269/266 |
| 2,754,708 | A | * | 7/1956 | Peterson | 269/224 |
| 3,507,404 | A | * | 4/1970 | Pompe | 414/796.2 |
| 4,047,709 | A | * | 9/1977 | Thyberg et al. | 269/22 |
| 4,572,564 | A | * | 2/1986 | Cipolla | 294/88 |
| 4,609,220 | A | * | 9/1986 | Scott | 294/87.1 |
| 5,403,057 | A | * | 4/1995 | Sugito et al. | 294/119.1 |

* cited by examiner

*Primary Examiner*—Dean J Kramer
(74) *Attorney, Agent, or Firm*—Barnes & Thornburg LLP

(57) ABSTRACT

A clamp having an adjustable tip assembly is provided. The adjustable tip assembly includes a finger, wedge and spreader. The finger is configured to engage the workpiece. The wedge is configured to engage the finger. The spreader is configured to engage the wedge, and applies a force against the wedge. The wedge, in turn, applies a force against the finger to hold the finger while engaging the workpiece.

19 Claims, 11 Drawing Sheets

ADJUSTABLE TIP ASSEMBLY

RELATED APPLICATIONS

The present application is related to and claims priority to U.S. Provisional Patent Application, Ser. No. 60/529,361, filed on Dec. 12, 2003, entitled Adjustable Tip Assembly and to U.S. Provisional Patent Application, Ser. No. 60/550,495, filed on Mar. 5, 2004, entitled Compliant Tip Assembly. The subject matter disclosed in those applications is hereby expressly incorporated into the present application.

TECHNICAL FIELD

The present disclosure is related to clamps which include adjustable tip assemblies. More particularly, the present disclosure is related to clamps having gripping tips that can selectively adjust to or comply with the irregular surfaces and/or thicknesses of workpieces or successive workpieces of variable thickness.

BACKGROUND AND SUMMARY

Clamps and grippers, typically pneumatically powered, can often be used in the sheet metal and other industries to hold, lift, or carry workpieces. Such clamps, however, may be required to grasp a workpiece that has been formed into a particular shape. Conventional prior art tips are permanently formed to the shape of the workpiece that needs to be grasped. There is no flexibility in such a tip, however. This can be problematic if workpieces of different shapes need to be grasped by the same clamp. Consequently, the entire tip must be replaced to grasp a differently shaped workpiece. This is also the case when grasping workpieces of different thicknesses. For example, often the range of travel of the clamp is fixed. Thus, when using conventional tips the clamp would have to be reset to pick up workpieces of different thicknesses. It would, thus, be beneficial to provide a tip assembly that can be configured to grasp workpieces of variable shape.

Accordingly, an illustrative embodiment of the present disclosure provides a clamp having an adjustable tip assembly. This embodiment of the adjustable tip assembly comprises a finger, a wedge and a spreader. The finger is configured to engage the workpiece. The wedge is configured to engage the finger. The spreader is configured to engage the wedge, and applies a force against the wedge. The wedge, in turn, applies a force against the finger to hold the finger while engaging the workpiece.

In the above and other illustrative embodiments, the adjustable tip assembly of the clamp may also provide: the finger comprising an angled surface; the angled surface of the finger engaging an angled surface located on a wedge; a housing which contains at least a portion of a finger, wedge, and spreader; a spreader comprising an angled surface that engages the wedge; a fastener that engages the spreader to apply a force against the wedge which applies a force against the finger to hold the finger in place; a spring that engages the finger; a plurality of fingers; a plurality of springs engagable with the fingers so the workpiece engaged by the fingers resists the bias of the springs; each of the plurality of fingers being biased by a spring so that resistance to the bias of the springs occurs when the fingers engage the workpiece; a plurality of wedges such that each of the plurality of wedges engages one of the plurality of fingers; the spreader being configured to engage each of the plurality of wedges to apply a force there against which applies a force against each of the plurality of fingers to hold the fingers in a position while the fingers engage the workpiece; and a fastener that engages the spreader to increase or decrease the force that can be applied against the fingers.

Another illustrative embodiment of the present disclosure provides a clamp having an adjustable tip assembly. This embodiment of the adjustable tip assembly comprises a plurality of fingers, wedges and a spreader. Each of the plurality of fingers is positionable with respect to the other. Each of the plurality of wedges is engagable with one of the plurality of fingers. The spreader engages the plurality of wedges and applies a force against each of the wedges which causes a force to be applied against the plurality of fingers to hold the fingers.

In the above and other illustrative embodiments, the adjustable tip assembly of the clamp may also provide: a plurality of springs engagable with the fingers so the workpiece engaged by the fingers resists the bias of the spring; each of the plurality of fingers is biased by a spring so that resistance to the bias of the spring occurs when the fingers engage the workpiece; and a fastener that engages the spreader to increase or decrease the force that can be applied against the fingers.

Another illustrative embodiment of the present disclosure provides a clamp having an adjustable tip assembly. This embodiment comprises a finger, a wedge and a spreader. The wedge is configured to engage the finger and the spreader is configured to engage the wedge. The spreader also applies a force against the wedge which applies a force against the finger to hold the finger.

In the above and other illustrative embodiments, the adjustable tip assembly of the clamp may also provide: the finger comprising an angled surface; the angled surface of the finger engaging an angled surface located on the wedge; a housing which contains at least a portion of the finger, wedge, and spreader; the spreader comprising an angled surface that engages the wedge; a fastener that engages the spreader to apply a force against the wedge which applies a force against the finger to hold the finger in place; a spring that engages the finger; and a plurality of fingers.

Another illustrative embodiment of the present disclosure provides a clamp having an adjustable tip assembly. This embodiment comprises a plurality of fingers and housing. Each of the plurality of fingers is independently positionable with respect to the other fingers. The housing is configured to contain at least a portion of the fingers. The fingers are also adjustably secured relative the housing.

In the above and other illustrative embodiments, the adjustable tip assembly of the clamp may also provide: a plurality of wedges, each configured to engage one of the plurality of figures; a lock that holds the fingers in a position; a plurality of springs, each engagable with and apply a bias against one of the fingers; a plurality of wedges each of which engages one of the plurality of fingers; a spreader configured to apply a force against each of the plurality of wedges which applies a force against each of the plurality of fingers to hold the plurality of fingers; and a fastener that engages the spreader to increase or decrease the force that can be applied against the fingers.

Another illustrative embodiment of the present disclosure provides an adjustable tip assembly for holding a workpiece having an irregular contour surface or successive workpieces of variable thickness. The adjustable tip assembly comprises a plurality of fingers and a lock. Each of the plurality of fingers is independently adjustable making each engagable with the irregular contour surface of the workpiece. The lock holds the fingers in a position that is engagable with the workpiece.

In the above and other illustrative embodiments, the adjustable tip assembly of the clamp may also provide a fastener configured to adjust the lock to hold the fingers into position.

Another illustrative embodiment of the present disclosure provides a method for clamping a workpiece having an irregular contour surface or successive workpieces of variable thickness. The method comprising: providing a clamp having at least one adjustable tip assembly, wherein the adjustable tip comprises a plurality of fingers each being independently adjustable to each other, and a lock; engaging the surface of the workpiece by the fingers; adjusting each of the fingers to engage the workpiece; and locking the fingers in position engaging the workpiece with the lock.

In the above and other illustrative embodiments, the adjustable tip assembly of the clamp may also provide a second adjustable tip assembly opposing the adjustable tip assembly, and grasping the workpiece between the fingers of the adjustable tip assemblies.

Another illustrative embodiment of the present disclosure provides a clamp comprising a movable arm and an adjustable tip assembly. The adjustable tip assembly is attached to the arm and comprises a plurality of fingers and a lock. The plurality of fingers is independently movable with respect to each other. The lock engages the fingers to hold the same.

In the above and other illustrative embodiments, the adjustable tip assembly of the clamp may also provide: an actuator that moves the arms; a plurality of wedges, each of which engages one of the fingers; the lock comprising a spreader that engages the plurality of wedges; and a fastener to adjust the spreader.

Additional features and advantages of the several embodiments of the disclosure will become apparent to those skilled in the art upon consideration of the following detailed description of the illustrated embodiment exemplifying the best mode of carrying out these embodiments as presently perceived.

BRIEF DESCRIPTION OF DRAWINGS

The present disclosure will be described hereafter with reference to the attached drawings which are given as non-limiting examples only, in which.

Figure 1:
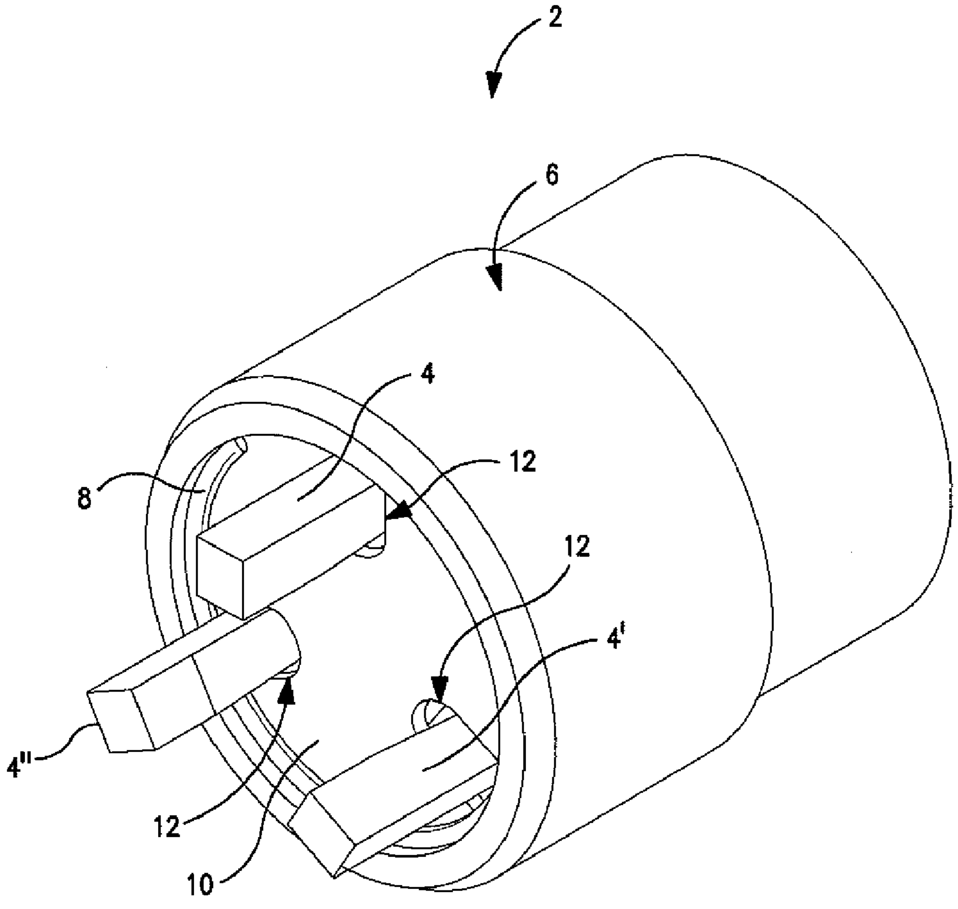
FIG. 1 is a perspective view of an illustrative embodiment of an adjustable tip assembly.

Corresponding reference characters indicate corresponding parts throughout the several views. The exemplification set out herein illustrates embodiments of the clamp and adjustable tip assemblies and such exemplification is not to be construed as limiting the scope of the clamp and adjustable tip assemblies in any manner.

DETAILED DESCRIPTION OF THE DRAWINGS

A perspective view of an illustrative embodiment of an adjustable tip assembly 2 is shown in FIG. 1. Shown in this illustrative embodiment, fingers 4, 4', and 4" extend from a housing 6. As shown, a retaining ring 8 holds cover 10 within housing 6 while allowing fingers 4, 4', and 4" to be disposed therethough at openings 12. Each of the fingers is independently movable to engage a workpiece having an irregular or variable surface. The fingers can then be locked simultaneously into the desired position. The same tip assembly can be reconfigured to engage and grip a workpiece having another irregular or variable surface.

Figure 2:
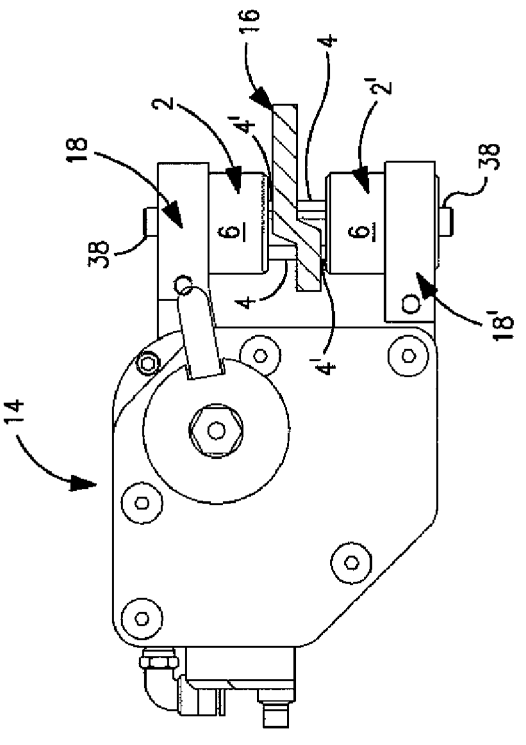
FIG. 2 is a side view of an illustrative clamp assembly comprising illustrative adjustable tip assemblies of FIG. 1 grasping a workpiece of irregular shape.

A side view of an illustrative clamp 14 comprising the adjustable tip assemblies 2 and 2' gripping a workpiece 16 having an irregularly contoured surface is shown in FIG. 2. Finger 4 of adjustable tip assembly 2 is configured to extend while finger 4' of adjustable tip assembly 2' retracts. Finger 4" (not shown in this view) likewise engages workpiece 16. Similarly, finger 4 of adjustable tip assembly 2' is configured to extend while finger 4' of adjustable tip assembly 2 is retracted. Consequently, the fingers follow the irregular contour surface of the workpiece. Also shown in this illustrative embodiment are jaw arms 18 and 18' grasping housing 6 of tip assemblies 2 and 2'. It is appreciated that assemblies 2 and 2' can attach to a clamp or gripper by any suitable manner. It is further appreciated that clamp 14 can be a pivoting clamp, a parallel moving jaw clamp, or similar gripper.

Figure 3A:
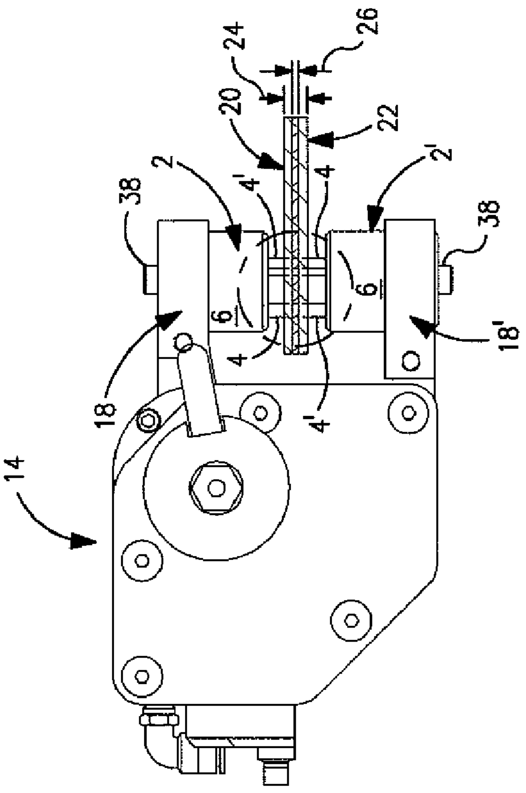
FIGS. 3*a* and *b* are side and detail views of an illustrative clamp assembly with illustrative adjustable tip assemblies of FIG. 1 grasping workpieces of irregular shape in the form of various thicknesses.
Figure 3B:
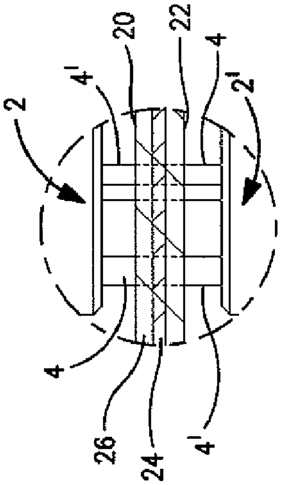

Another side view of clamp 14 is shown in FIGS. 3*a* and *b*. Specifically, FIG. 3*a* shows adjustable tip assemblies 2 and 2' being configurable to grasp either workpieces 20 and 22. Each of the workpieces 20 and 22 have a different thickness as indicated by reference numbers 24 and 26 respectively. When grasping workpiece 20, fingers 4, 4', and 4" all engage the surface of workpiece 20, as does fingers 4, 4', and 4" of tip assembly 2'. In an illustrative embodiment, fingers 4, 4', and 4" are reconfigurable so they can also grasp subsequent workpieces of different thicknesses. For example, workpiece 20 having a thickness indicated by reference numeral 26 can also be grasped by fingers 4, 4', and 4", without replacement thereof. As shown in the detailed view of FIG. 3*b,* workpiece 20 is being grasped by fingers 4, 4', and 4" on both tip assemblies 2 and 2'. Shown in phantom, are fingers 4, 4', and 4" of both tip assemblies 2 and 2' engaging the workpiece 22 having the lesser thickness 26.

Figures 4, 5:
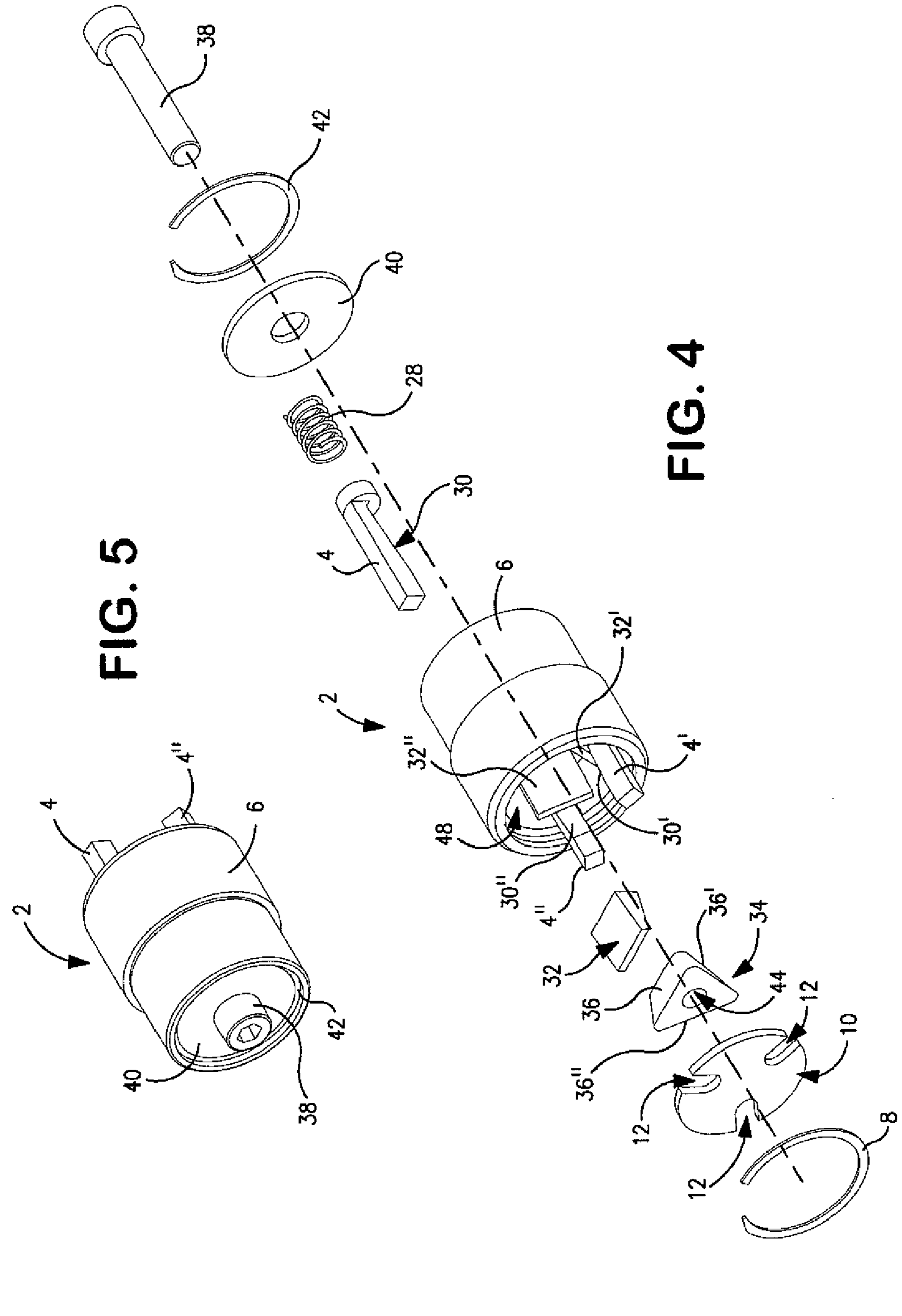
FIG. 4 is an exploded view of the illustrative adjustable tip assembly.
FIG. 5 is a rearward perspective view of the illustrative adjustable tip assembly.

An exploded view of adjustable tip assembly 2 is shown in FIG. 4. This illustrative embodiment comprises fingers 4, 4', and 4" each partially located within housing 6. Each of the fingers 4, 4', and 4" also engage a corresponding spring 28 and 28'. (See also FIG. 8.) Fingers 4, 4', and 4" also comprise an illustrative angle surface 30, 30', and 30". These angled surfaces are configured to engage a corresponding angled surface on wedges 32, 32', and 32". A spreader 34 comprises angled surfaces 36, 36', and 36". The angled surfaces of spreader 34 are configured to engage the opposing surface of each wedge 32, 32', and 32". A fastener 38 is disposed through washer 40 and retaining ring 42. The fastener 38 is configured to engage spreader 34, illustratively bore 44, to tighten or loosen spreader 34. This tightening and loosening of spreader 34 holds and releases fingers 4, 4', and 4". Cover 10 caps spreader 34 and the other internal structures within housing 6. Openings 12 in cover 10 allow fingers 4, 4', and 4" to extend therethrough. Retainer ring 8 holds cover 10 to housing 6.

A rearward view of adjustable tip assembly 2 is shown in FIG. 5. This view shows the position of fastener 38, washer 40, and retaining ring 42 with respect to housing 6. Also shown are fingers 4, and 4". It is appreciated that fastener 38 is configured to tighten or loosen spreader 34 to allow adjustment of fingers 4, 4', and 4". It is further appreciated other fasteners may be configured to accomplish this task, and that the fastener shown herein is an illustrative embodiment. In addition, this illustrative embodiment shows access to the fastener for adjusting means located exterior of housing 6. It is appreciated, however, that other mechanisms of adjustment and access thereto can be used.

Figure 6B:
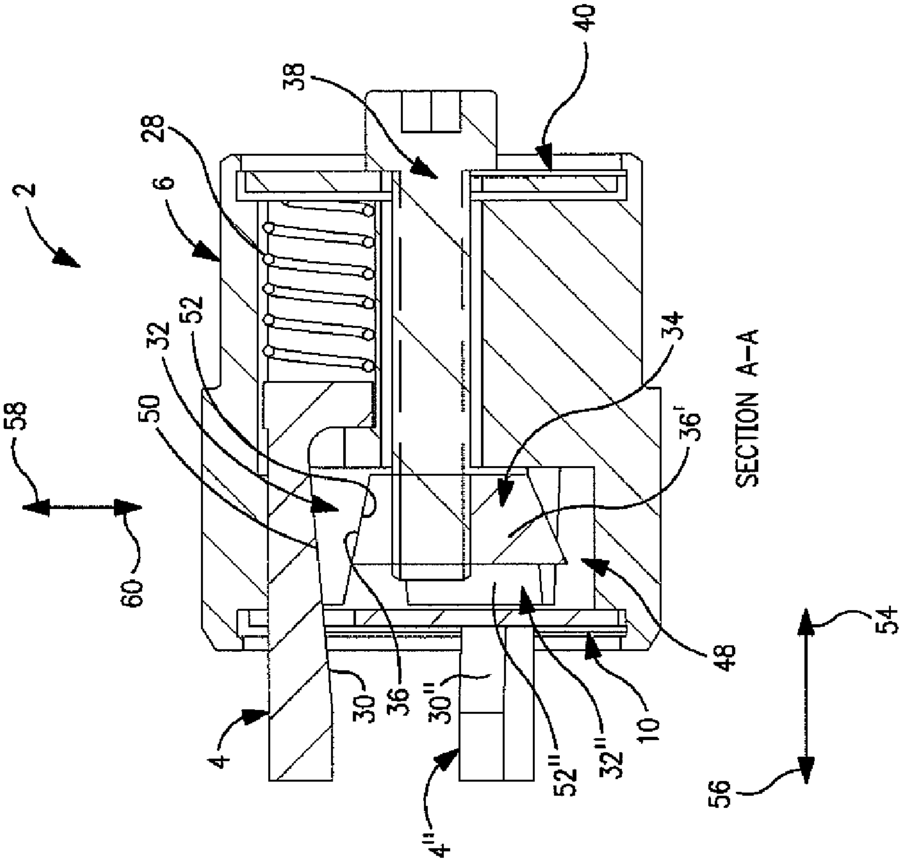
FIGS. 6*a* and *b* are front and side-cross-sectional views of the adjustable tip assembly of FIG. 4.
Figure 6A:
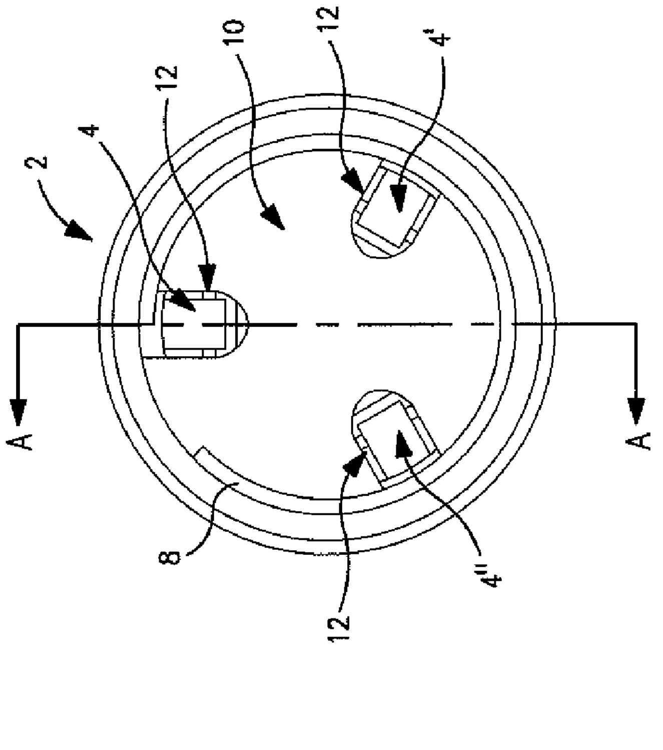

A front view and side-cross-section view of adjustable tip assembly 2 is shown in FIGS. 6*a* and *b*, respectively. The forward view of assembly 2, as shown in FIG. 6*a*, discloses the illustrative position of fingers 4, 4', and 4" with respect to each other. Cover 10 is illustratively located over spreader 34 (not shown in this view) and is configured to prevent dirt and contaminants from entering housing 6 during the operation of tip assembly 2. It is appreciated that other configurations of the fingers, and/or cover, fall within the scope of this disclosure.

The side-cross-sectional view of the assembly 2 in FIG. 6*b* is taken along lines A-A of FIG. 6*a*. This view shows the interaction and attachment of the several components of assembly 2 with respect to each other. Illustratively, finger 4 positioned within cavity 48 of housing 6 comprises angled surface 30. Illustratively, angled surface 30 of finger 4 is configured to abut the angled surface 50 of wedge 32. Opposite surface 52 of wedge 32 is configured to engage surface 36 of spreader 34. Fastener 38 is illustratively disposed through spreader 34 such that, as fastener 38 is rotated, it draws spreader either inward in direction 54 or outward in direction 56. Spring 28 engages finger 4 and washer 40 and is configured to bias the fingers in direction 56. Springs 28 through 28" bias against the force created by the workpiece on the fingers so they can be positioned to conform to that workpiece's shape. As spreader 34 is drawn in direction 54, the engagement between surfaces 36 and 52 of spreader 34 and wedge 32, respectively, and finger 4 create opposing forces in directions 58 and 60. These opposing forces prevent finger 4 from moving. It is appreciated that this same mechanism (wedge effect) operates on fingers 4' and 4" as well. This opposing force from spreader 34 against the wedges 32, 32', and 32" and against all of the fingers 4, 4', and 4" keep them in a held or locked position.

Figure 7B:
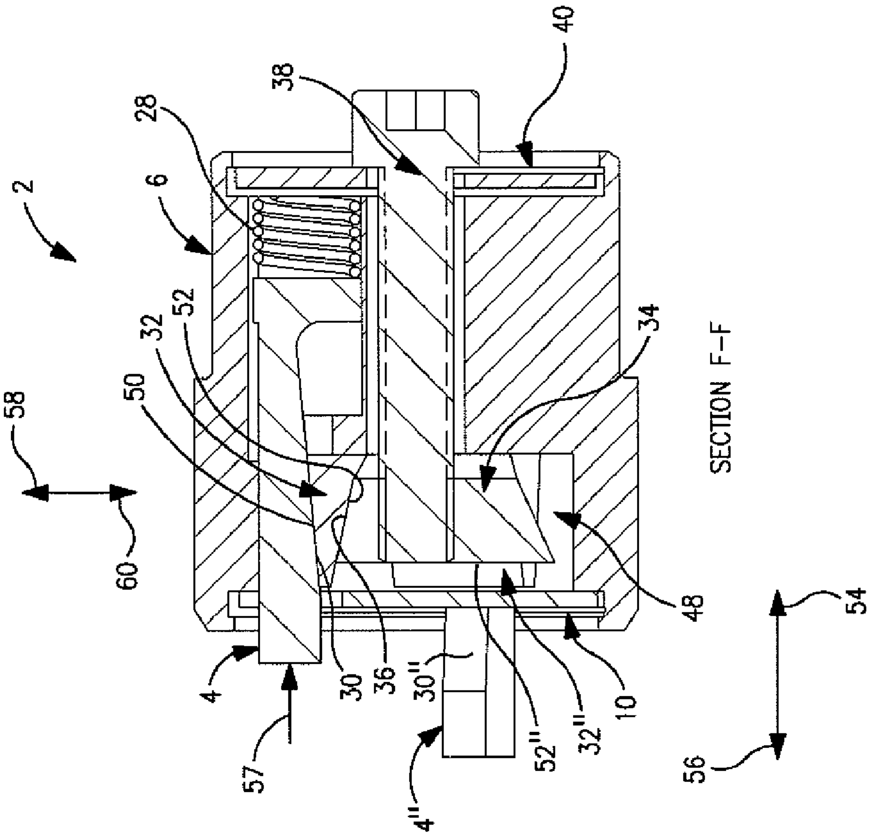
FIGS. 7*a* and *b* are front and side-cross-sectional views of the adjustable tip assembly of FIG. 4 with a force being applied to a finger.
Figure 7A:
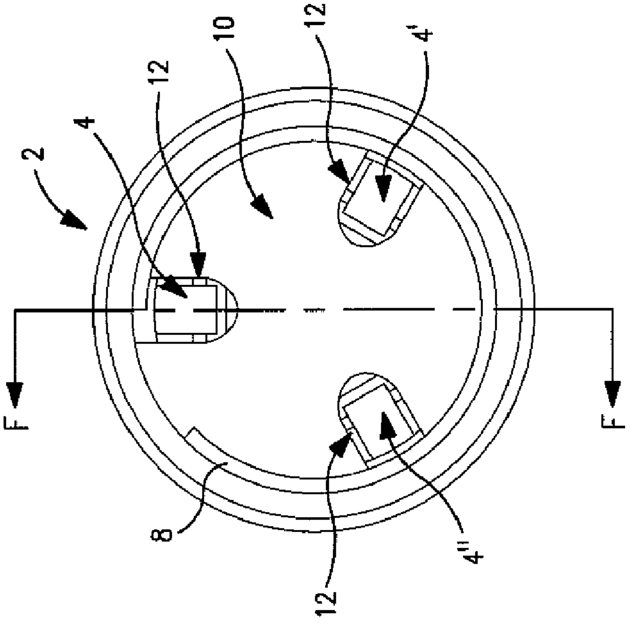

Another front view and side-cross-section view of adjustable tip assembly 2 is shown in FIGS. 7*a* and *b*, respectively. Similar to view in FIG. 6*a*, the forward view of assembly 2 of FIG. 7*a*, discloses the illustrative position of fingers 4, 4', and 4" with respect to each other. Cover 10 is illustratively located over spreader 34 (not shown). The side-cross-sectional view of the assembly 2 in FIG. 7*b* is taken along lines F-F of FIG. 7*a*. This view is similar to that shown in FIG. 6*b*, except that a force 57 is applied to finger 4. It is appreciated that tip assembly 2 can engage a workpiece for holding the same in a clamp with disproportionate amount of force applied to the individual fingers. As shown here, finger 4 has a force 57 applied thereon that is not applied to finger 4". When fastener 38 loosens spreader 34, the fingers are allowed to move within cavity 48 in directions 54, 56. This movement allows the fingers to conform to the irregular surface or variable thickness of a contacting workpiece. Fastener 38 can then tighten which applies a force against the wedges and fingers to hold those fingers in the conforming shape. The springs 28 ensure that the fingers remain engaged to the workpiece surface during this setting process. Once the fingers are set in position, the workpiece can be removed from the fingers. These fingers, however, maintain their conforming position. This allows a workpiece of the same or similar irregular shape to be grasped. If a workpiece with different irregular shape is to be grasped, tip assembly 2 does not have to be replaced. Rather, the aforementioned process is simply repeated.

Figure 8:
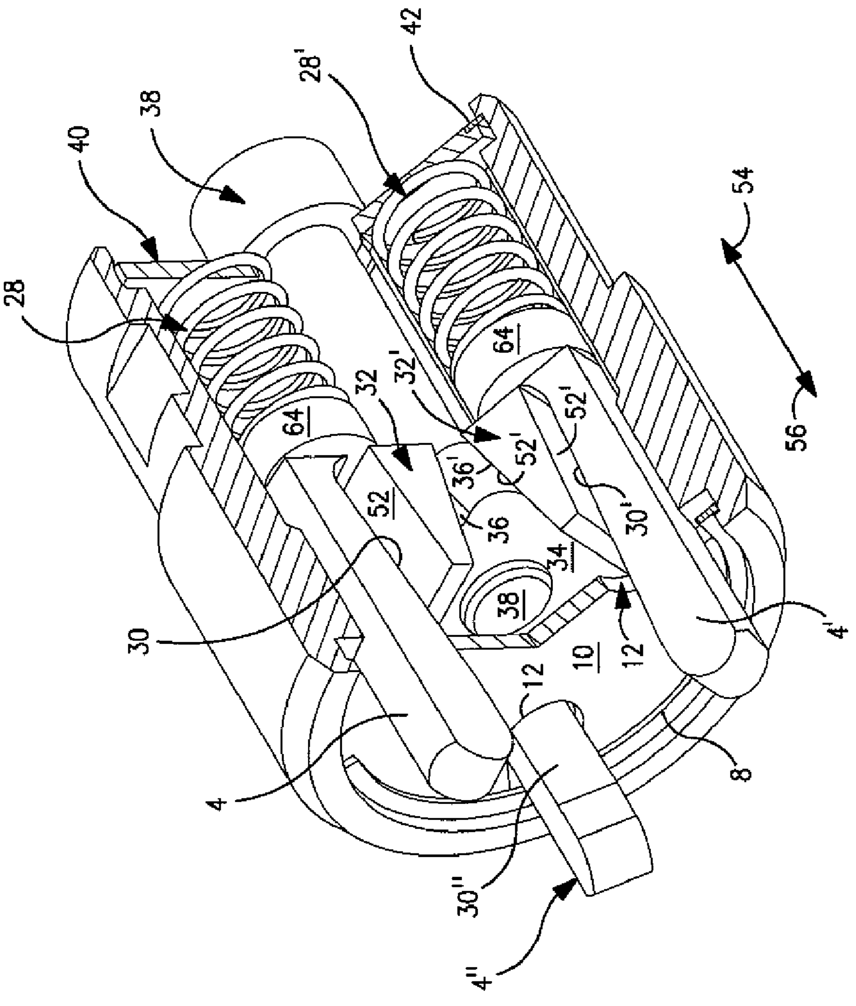
FIG. 8 is a perspective, partial-cutaway view of the illustrative adjustable tip assembly.

A perspective partially cutaway view of adjustable tip assembly 2 is shown in FIG. 8. This view shows the engagement between fingers 4, 4', and 4" and wedges 32, 32', 32" with spreader 34 and springs 28, 28', 28". In this illustrative embodiment, each of the angled surfaces 52, 52', and 52" of wedge 32, 32', 32", respectively, engage corresponding surfaces 30, 30', 30" of the fingers 4, 4', and 4". The surfaces 36, 36', and 36" of spreader 34 engage the angled surface 52, 52', 52" of wedges 32, 32', 32", respectively, to cause the same to create the wedge force between the spreader and the fingers. As fastener 38 draws spreader 34 in direction 54, wedges 32 through 32" are forced against fingers 4 through 4", securing or holding the fingers in place against the inner wall of housing 6. Because each finger is engagable with its own spring 28 through 28", adjustable tip assembly 2 can engage and conform to a workpiece having any irregular shape before fastener 38 is tightened in direction 54. The contour of the workpiece creates the force 57 opposite the bias of the spring allowing each finger to engage the workpiece regardless of its contour. (See, also, FIG. 7.) Once the position of the fingers is set, fastener 38 can be tightened to hold fingers 4 through 4" in position against the contour of the workpiece.

Figure 9A:
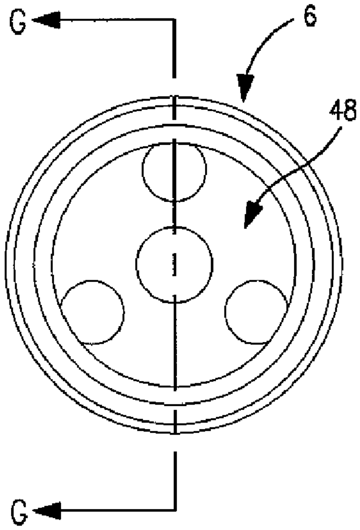
FIGS. 9*a* and *b* are end-elevation and side-cross-sectional views of an illustrative housing portion of the adjustable tip assembly.
Figure 9B:
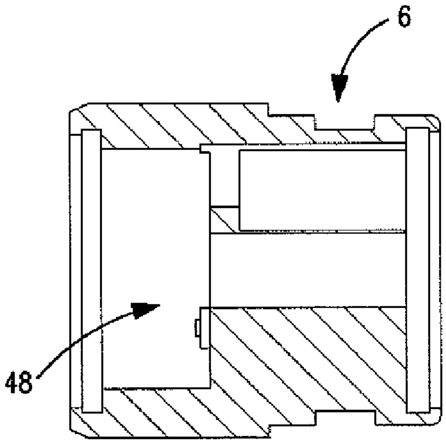

Front and side-cross-sectional views of an illustrative embodiment of housing 6 is shown in FIGS. 9*a* and *b*. This illustrative embodiment shows cavity 48 that receives the fingers, springs, spreader, and fastener. It is appreciated that the housing can be configured to contain any number of fingers of any variety or configuration.

Figure 10:
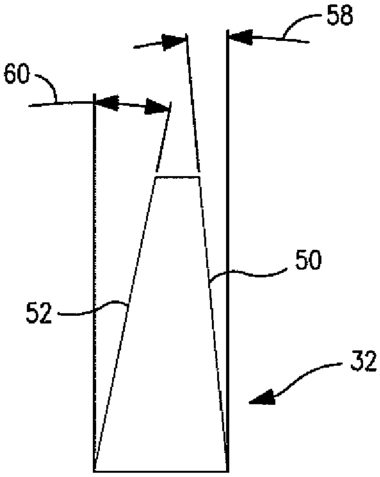
FIG. 10 is a side view of an illustrative wedge from the adjustable tip assembly of FIG. 4.

A side view of an illustrative wedge 32 is shown in FIG. 10. In this illustrative embodiment, the angles of surfaces 50 and 52 are indicated by reference numerals 58 and 60, respectively, and are about 5 degrees and 12 degrees, respectively, with an illustrative tolerance of about plus or minus 0.5 degrees. These angles are suitable to create the necessary wedging effect as desired when engaging the spreader and the finger. It is appreciated that the angles 58 and 60 can be varied depending on the configurations of the fingers and the lock or spreader that wedge 32 is positioned between. It is further appreciated that wedges 32' and 32" can have the same or different configuration as described herein for wedge 32.

Figure 11:
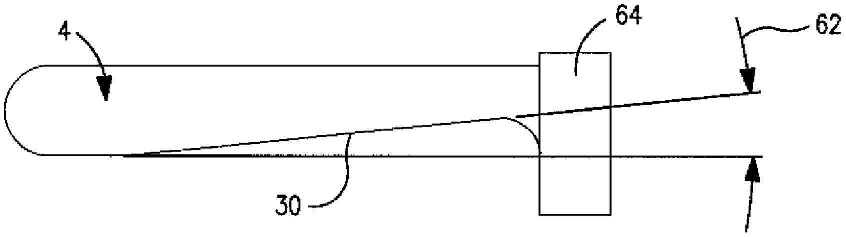
FIG. 11 is a side view of an illustrative finger from the adjustable tip assembly of FIG. 4.

A side view of an illustrative finger 4 is shown in FIG. 11. This illustrative finger has an angled surface 30, as indicated by reference numeral 62, that measures about 5 degrees with a tolerance of about plus or minus 0.5 degrees. In this illustrative embodiment the 5 degree angle is complimentary to the angle 58 of surface 50 of wedge 32. It is appreciated, however, that the degree of angle can be dependent on the type angle of the wedge being used, as well as the configuration of the finger itself. In addition, a base 64 is shown that is configured to engage spring 28 as shown in FIG. 7, for example. It is further appreciated that the base or other analogous surface can be used to engage a bias member to assist in the engagement of the workpiece.

Figure 12A:
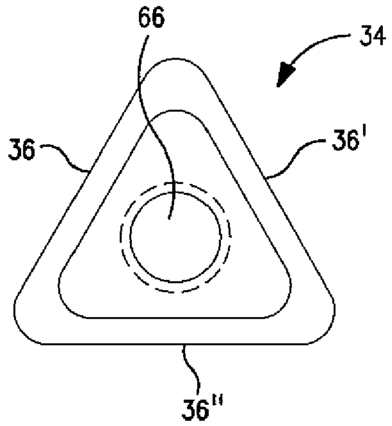
FIGS. 12*a* and *b* are top-facing and side views of an illustrative spreader from the adjustable tip assembly of FIG. 4.
Figure 12B:
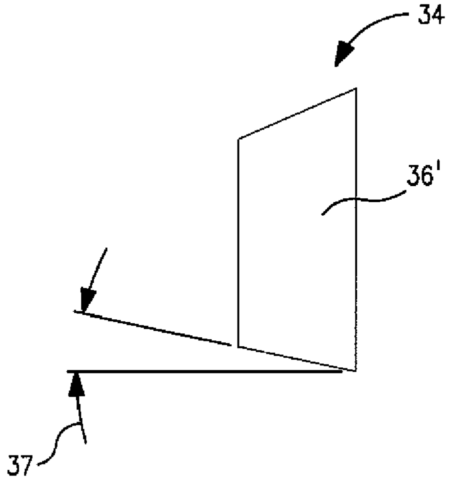

Top facing and side views of spreader 34 are shown in FIGS. 12*a* and *b*. In this illustrative embodiment, as shown in FIG. 12*a*, spreader 34 is triangularly shaped and includes a center bore 66 to receive the fastener 38, as previously described. Spreader 34 comprises angled surfaces 36 through 36" that engages surfaces 52 through 52" of wedges 32 through 32", respectively. It is appreciated that the shape of spreader 34 is not limited to the triangular shape as shown herein. This shape is so configured to allow spreader 34 to engage each of the fingers of tip assembly 2. Other shapes can be used, such as square, circular, etc., depending on the configuration and number of fingers that are to be engaged. The side view of spreader 34 of FIG. 12*b* shows angle 37 of sides 36 through 36". In this illustrative embodiment angle 37 is about 12 degrees with a tolerance of about plus or minus 0.5 degrees. It is appreciated, however, that the surfaces are not limited to that precise angle, nor are they limited to all being identical angles. It is appreciated that the angle or angles of the surfaces may vary depending on the configuration and number of fingers and/or wedges or other locking structures desired.

Figure 13:
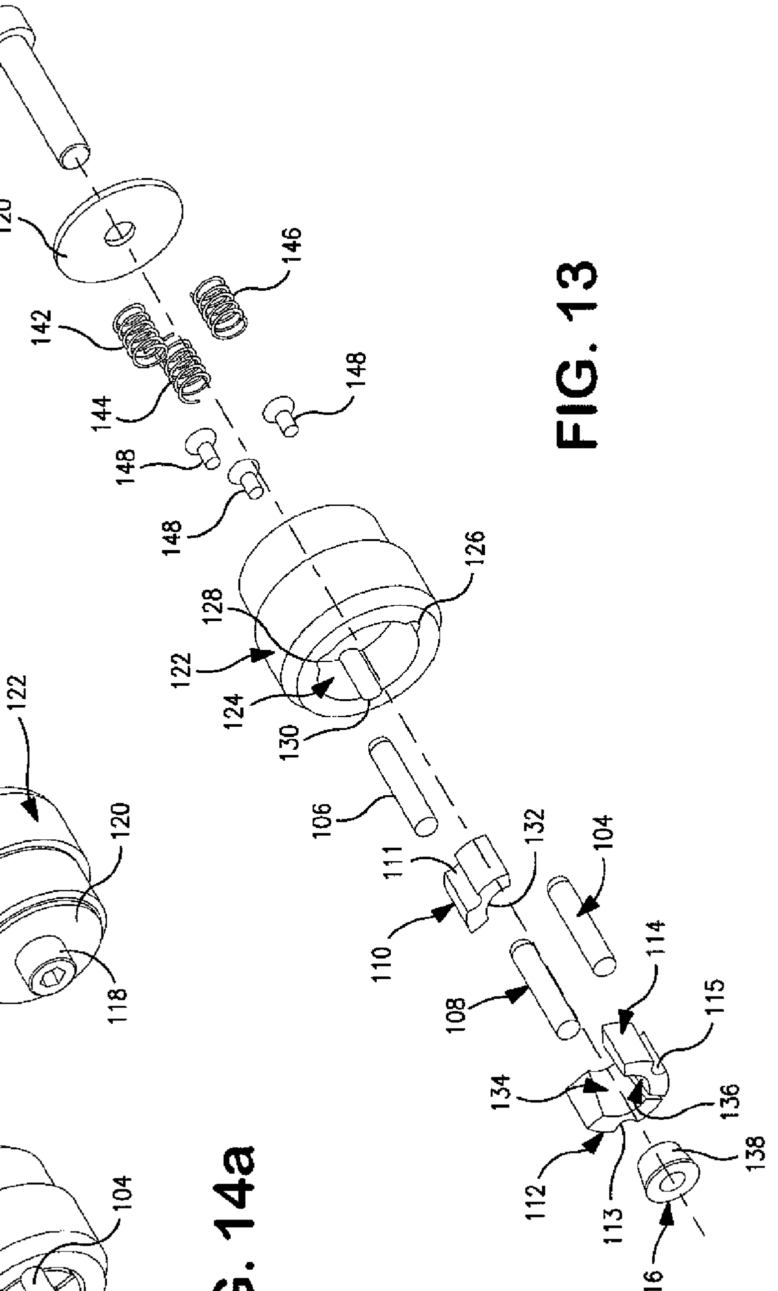
FIG. 13 is an exploded perspective view of another illustrative embodiment of the adjustable tip assembly.

An exploded view of a new embodiment of adjustable tip assembly 100 is shown in FIG. 13. This assembly is distinguishable from assembly 2 in that fingers 104, 106, and 108 of this present embodiment are not angled as they are in assembly 2. Specifically, this view shows housing 122 having cavity 124 that receives fingers 104, 106, and 108 in recesses 126, 128, and 130, respectively. Also fitted within cavity 124 are wedges 110, 112, and 114. These wedges also include recesses 111, 113, 115 that correspond to the shape of the fingers so they are slideable within recesses 126, 128 and 130 of cavity 124. Additionally, wedges 110, 112, and 114 comprise angled surfaces 132, 134, and 136, which, together, form an angle compliment to angle 138 of nut 116. Accordingly, in this embodiment, as angle surface 138 of nut 116 engages angled surfaces 132 through 136, the wedges are drawn outwardly, similar to that described with respect to the wedges 32, 32' and 32" of assembly 2 to hold the fingers. Also shown in this view is cap screw 118, washer 120, and springs 142, 144, and 146. These structures operate similar to that described with respect to tip assembly 2. Illustratively, fasteners 148 prevent fingers 104 through 108 from falling out of housing 122. It is appreciated that angled fingers could illustratively be used with wedges of the type shown in this embodiment.

Figure 14B:
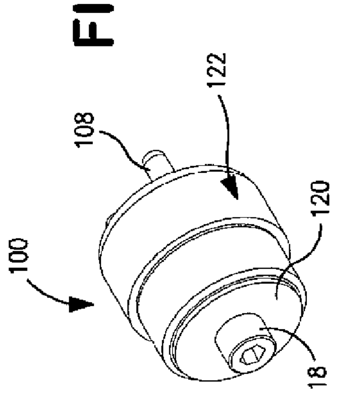
FIGS. 14*a* and *b* are forward and rearward perspective views of the illustrative adjustable tip assembly of FIG. 13.
Figure 14A:
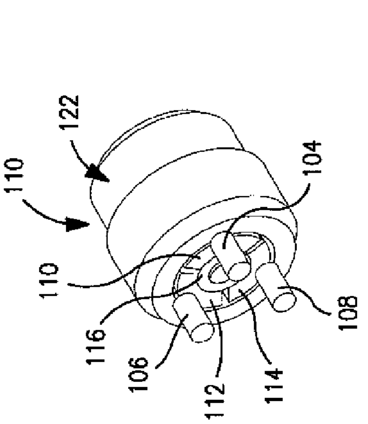

A perspective view of the illustrative adjustable tip assembly 100 is shown in FIG. 14*a*. Also shown in this view are fingers 104, 106, and 108, and wedges 110, 112, and 114. This view further shows nut 116 that engages wedges 110 through 114. A reverse perspective view of assembly 100, showing cap screw 118 and washer 120, is shown in FIG. 14*b*.

Figure 15A:
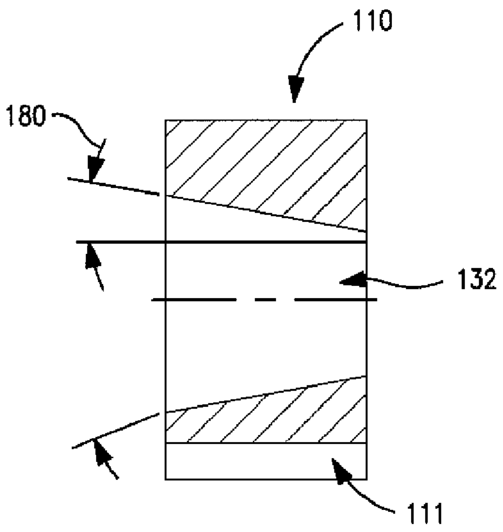
FIGS. 15*a* and *b* are top and side-cross-sectional views of an illustrative wedge from the adjustable tip assembly of FIG. 13.
Figure 15B:
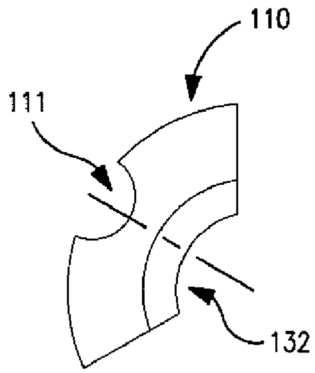

Top and side-cross-sectional views of an illustrative wedge 110, for use on adjustable tip assembly 100, are shown FIGS. 15*a* and *b*. It is appreciated that the wedge 110 is the same as wedges 112 and 114, shown in FIG. 13. This view of wedge 110 further shows recess 111, as well as angle surface 132. The cross-sectional view shown in FIG. 15*b* also shows recess 111 and angle surface 132. In this illustrative embodiment the angle, indicated by reference numeral 180, is illustratively 10 degrees, or a total of about 20 degrees from opposite angled surfaces. This angle is configured to correspond with the about 20 degree angle indicated by reference numeral 189 of nut 116 shown in FIGS. 13 and 17. It is further appreciated that the angle 180 may vary based on the configuration of the wedge, as well as the nut or spreader. It is still further appreciated that although wedge 32 is "wedge" shaped, in another illustrative embodiment the wedge does not have to be wedge shaped. Rather, its shape can be any shape or configuration that assists in selectively holding a finger or fingers in a desired position.

Figure 16A:
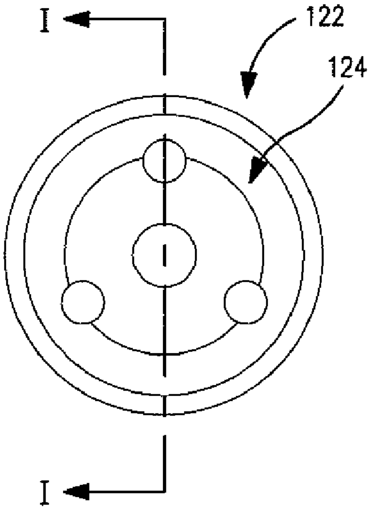
FIGS. 16*a* and *b* are top-facing and side-cross-sectional views of the illustrative housing from the adjustable tip assembly of FIG. 13.
Figure 16B:
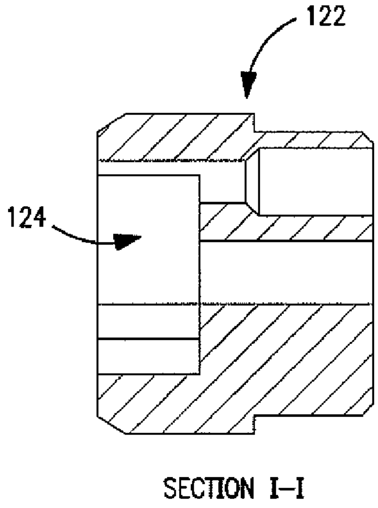

A front view and side-cross-sectional view of housing 122 are shown in FIGS. 16*a* and *b*. These views show cavity 124 disposed within housing 122. The cross-sectional view shown in FIG. 16*b* is taken along lines I-I of FIG. 16*a*. It is appreciated that the configuration of housing 122 and cavity 124 can be modified based on the configuration of the fingers, as well as other internal structures.

Figure 17A:
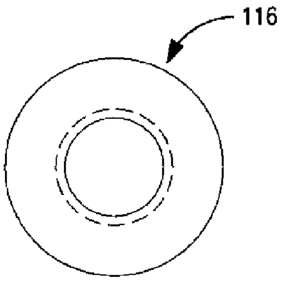
FIGS. 17*a* and *b* are top-facing and side views of an illustrative spreader of the adjustable tip assembly of FIG. 13.
Figure 17B:
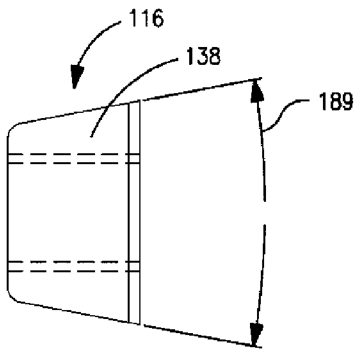

A front and side view of nut 116 are shown in FIG. 17. The angle of surface 138 is illustratively 20 degrees with a tolerance of about 2 degrees. This angle compliments the angle of surface 132 shown in FIG. 15. It is appreciated that this angle can be adjusted depending on the configuration and number of wedges and fingers. The purpose of the angle is to engage wedge surfaces 132, 134 and 136 and hold fingers 104, 106, and 108 in place once located against the contour of a workpiece.

Figure 18C:
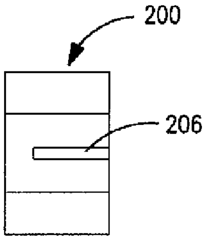
FIGS. 18*a* through *c* are top-facing, side, and side-cross-sectional views of another illustrative embodiment of a wedge for use in the adjustable tip assembly.
Figure 18A:
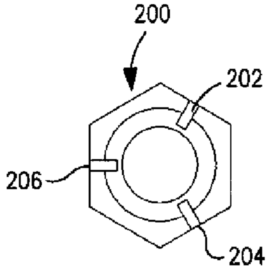
Figure 18B:
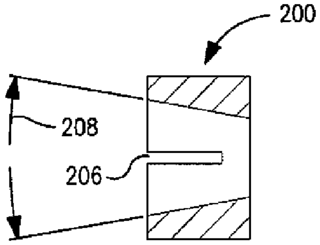

Top facing, side and side-cross-sectional views of another illustrative embodiment of a wedge 200 are shown in FIGS. 18*a* through *c*. In this illustrative embodiment wedge 200 comprises slots 202, 204, and 206. In this illustrative embodiment the slots are configured to allow the wedge, which can be unitary or monolithic, to flex at the sidewalls so a spreader or other locking member can engage wedge 200 to hold the fingers within the tip assembly. Again, the angle of the sidewalls of the wedge, indicated by reference numeral 208, can be any angle that is complimentary to the angle of the spreader or lock that allows the wedge to engage the fingers to hold the same in place.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A clamp having an adjustable tip assembly for engaging a workpiece, the adjustable tip assembly comprising:
- a finger configured to engage the workpiece;
- a wedge having first and second surfaces, and configured to engage the finger; and
- a spreader configured to engage the wedge;
- wherein an axis extends through the adjustable tip assembly;
- wherein the finger is oriented parallel to the axis and has an angled surface located nonparallel to the axis;
- wherein the spreader has an angled surface that is located facing the angled surface of the finger;
- wherein the wedge is located between the finger and the spreader, with the first surface engaging the angled surface of finger and the second surface engaging the angled surface of the spreader; and
- a fastener that engages the spreader to apply a force against the wedge which applies a force against the finger to hold the finger in place.

2. The clamp of claim 1, wherein the first surface of the wedge is an angled surface located nonparallel to the axis.

3. The clamp of claim 2, wherein the second surface of the wedge is an angled surface.

4. The clamp of claim 1, further comprising a housing which contains at least a portion of the finger, wedge, and spreader.

5. The clamp of claim 1, wherein the adjustable tip assembly further comprises a spring that engages the finger.

6. The clamp of claim 1, wherein the adjustable tip assembly further comprises a plurality of fingers.

7. The clamp claim 6, wherein the adjustable tip assembly further comprises a plurality of springs engagable with the fingers so the workpiece engaged by the fingers resists the bias of the springs.

8. The clamp of claim 6, wherein each of the plurality of fingers of the adjustable tip assembly are biased by a spring so that resistance to the bias of the springs occurs when the fingers engage the workpiece.

9. The clamp of claim 8, wherein the adjustable tip assembly further comprises a plurality of wedges such that each of the plurality of wedges engages one of the plurality of fingers.

10. The clamp of claim 9, wherein the spreader of the adjustable tip assembly is configured to engage each of the plurality of wedges to apply a force there against which applies a force against each of the plurality of fingers to hold the fingers in a position while the fingers engage the workpiece.

11. The clamp of claim 10, wherein the adjustable tip assembly further comprises a fastener that engages the spreader to increase or decrease the force that can be applied against the fingers.

12. A clamp having an adjustable tip assembly which comprises:
- a plurality of fingers, each of which being positionable with respect to each other;
- a plurality of wedges, each of which being engagable with one of the plurality of fingers; and
- a spreader that engages the plurality of wedges;
- wherein the wedges are located between the fingers and spreader;
- wherein the spreader applies a force against each of the wedges which causes a force to be applied against the plurality of fingers to hold the fingers;
- wherein the spreader has a plurality of periphery surfaces each of which engages a wedge; and
- a fastener at least a portion of which is centrally located between the plurality of wedges;
- wherein the fastener engages the spreader to increase or decrease the force that can be applied against the fingers.

13. The clamp of claim 12, wherein the adjustable tip assembly further comprises a plurality of springs engagable with the fingers so the workpiece engaged by the fingers resists the bias of the spring.

14. The clamp of claim 12, wherein each of the plurality of fingers is biased by a spring so that resistance to the bias of the spring occurs when the fingers engage the workpiece.

15. The clamp of claim 12, wherein the plurality of angled fingers each comprise an surface.

16. A clamp having an adjustable tip assembly which comprises:
- a plurality of fingers, each of which being independently positionable with respect to each other;
- a plurality of wedges each abutting one of the plurality of fingers;
- a spreader centrally located in the adjustable tip assembly with the plurality of wedges located between the spreader and the plurality of fingers;
- a housing configured to contain at least a portion of the fingers; and
- wherein the spreader produces an outward force on the wedges and fingers against the housing; and
- wherein the fingers are adjustably secured relative the housing.

17. The clamp of claim 16, wherein the adjustable tip assembly further comprises a lock that holds the fingers in a position.

18. The clamp of claim 16, wherein the adjustable tip assembly further comprises a plurality of springs each engagable with and apply a bias against one of the fingers.

19. The clamp of claim 16, wherein the adjustable tip assembly further comprises a fastener that engages the spreader to increase or decrease the force that can be applied against the fingers.

* * * * *